(No Model.)
E. C. PARAMORE.
SECONDARY BATTERY PLATE.
No. 476,483. Patented June 7, 1892.
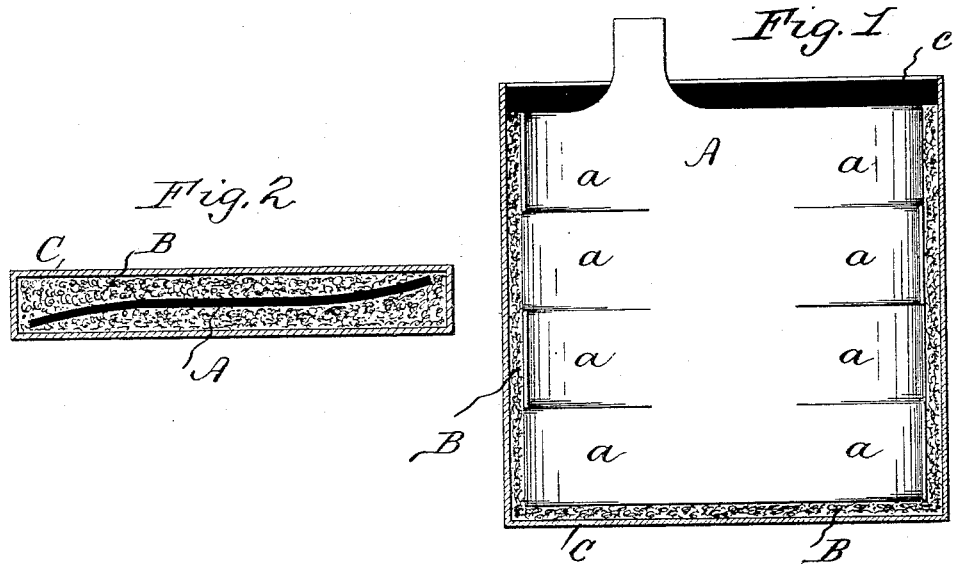
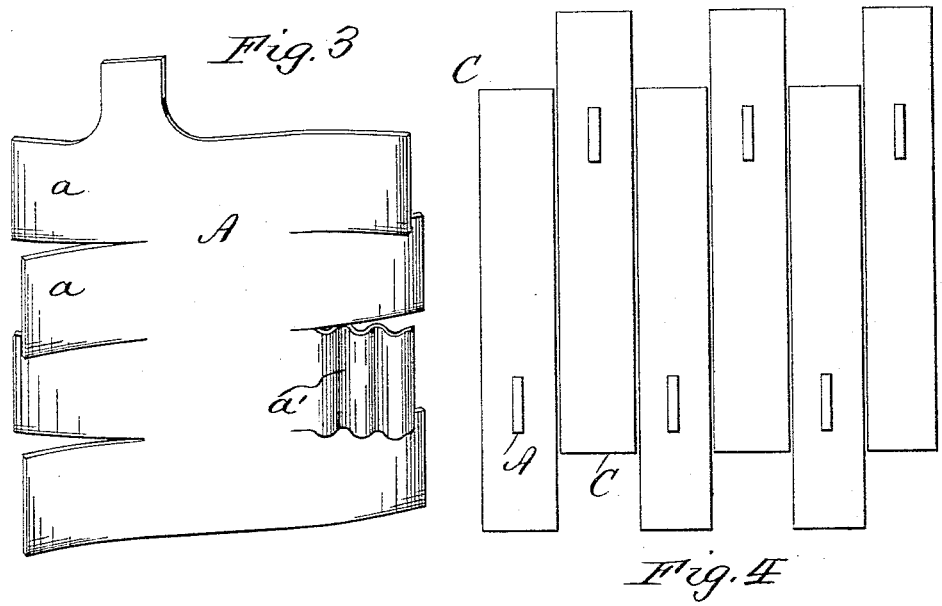
WITNESSES:
Chas F. VanHorn
M. Walker
INVENTOR,
Edward C. Paramore
By S. J. VanStavoren
ATTORNEY

UNITED STATES PATENT OFFICE.

EDWARD C. PARAMORE, OF PHILADELPHIA, PENNSYLVANIA, ASSIGNOR, BY MESNE ASSIGNMENTS, TO THE PARAMORE ELECTRIC COMPANY, OF WEST VIRGINIA.

SECONDARY-BATTERY PLATE.

SPECIFICATION forming part of Letters Patent No. 476,483, dated June 7, 1892.

Application filed September 2, 1890. Renewed October 31, 1891. Serial No. 410,434. (No model.)

*To all whom it may concern:*

Be it known that I, EDWARD C. PARAMORE, a citizen of the United States, residing at Philadelphia, in the county of Philadelphia and State of Pennsylvania, have invented certain new and useful Improvements in Secondary or Storage Batteries, of which the following is a specification.

My invention has relation generally to that form of secondary or storage batteries wherein the grid or lead plate and the active material are inclosed within a porous or perforated cup or receiver, and particularly to that form of the same wherein the grid or lead plate is composed of leaves or sections; and it has for its object an economical and easily-prepared grid or lead plate having leaves or sections which present a maximum area or surface to the active material, reduce the weight of the elements or the battery, increase the durability or life and efficiency of the same, and yet admit of obtaining the advantages of no loss of active material due to detachment from the grid or lead plate nor of buckling and consequent short-circuiting and burning of the plates in charging the same.

My invention accordingly consists of the combinations, constructions, and arrangements of parts comprising a storage-battery plate and an element or elements, as hereinafter described in the specification, and pointed out in the claims.

Reference is had to the accompanying drawings, wherein—

Figure 1 is a section, partly in elevation, of a plate embodying my invention. Fig. 2 is a horizontal section of the same. Fig. 3 is a perspective of the lead or analogous grid for the plate, and Fig. 4 is a plan view of an element constructed and arranged for circuit connection in accordance with my invention.

A represents the grid or lead or other plate, consisting of a strip of sheet-lead, which may be of any suitable size and configuration or construction, being so configured or constructed that it presents the greatest area or surface possible to the active material, and to this end I take a plate or grid of sheet-lead and scarify or otherwise divide the same into various leaves, sections, or parts $a$, which may be bent, curved, or corrugated to take different directions through the active material B to present a large area or surface to such material B, and the form or character of the latter which I prefer to use is litharge, and instead of securing it to the grid I place the latter and the litharge in a porous cup C, made of potters' clay or other suitable material. Instead, however, of using a porous material, I may use a non-porous material, which is perforated or otherwise made porous or open for the passage of the electrolyte.

The above-described grid is more plainly shown in Fig. 3, wherein one of its leaves, corrugated or similarly formed, is shown at $a'$.

If desired, the top of the plate or the cup C may be seated by a layer of plaster-of-paris or other suitable material, as indicated at $c$, Fig. 1.

The negative and positive plates, constructed as desired, may have the same active material, or such material may be different for the two plates, as usual. In practice I have obtained very marked results with the negative and positive plates composed of the same materials.

The elements are electrically connected as usual or as desired, the same being within the province of those skilled in the art to which my invention appertains.

From the foregoing it will be noted that the grid or lead or other plate consists of a single strip or sheet cut or divided into numerous leaves, sections, or parts $a$, which are preferably differently directed through the active material to present the largest area or surface possible to such material. As such grids are composed of a single sheet or strip, they can be economically made, and are of less weight proportionally to their area or surface exposed to the active material, thereby reducing the weight of the battery or element without impairing its efficiency.

The use of the porous or perforated cup or holder for the grid and the active material enables me to provide plates which can be arranged close or contiguous together, as desired, without danger or liability of the same buckling when charged, and as such buckling cannot occur the burning of said plates in charging is avoided; also, no deposit of active material in the cells or jars can take place to short-circuit the current. In addition to which the plates as a whole can be made of a small width, without carrying a surplus or dead weight of active material, which has heretofore made these batteries of an undue weight. The porous cups may be round in cross-section or oblong or otherwise configured, as desired.

Any suitable electrolyte may be used—for instance, the usual one, sulphuric-acid water.

What I claim is—

1. A secondary or storage battery plate composed of a porous cup, a grid consisting of a strip or sheet cut or divided into leaves and located in said cup, and active material in the latter surrounding said grid or plate, substantially as set forth.

2. A secondary or storage battery plate composed of a grid or lead plate consisting of a strip or sheet cut or divided into leaves $a$, differently-directed active material in contact with said grid, and the latter and the active material inclosed in a porous cup, substantially as set forth.

3. In a secondary or storage battery plate, the combination of a porous cup or receiver, active material in said cup, a strip or sheet-lead grid cut or divided into leaves, and the latter directed through the active material, substantially as set forth.

In testimony whereof I affix my signature in presence of two witnesses.

EDWARD C. PARAMORE.

Witnesses:
GEORGE W. SELTZER,
AUGUSTUS H. BECKMANN.